Figure 1:
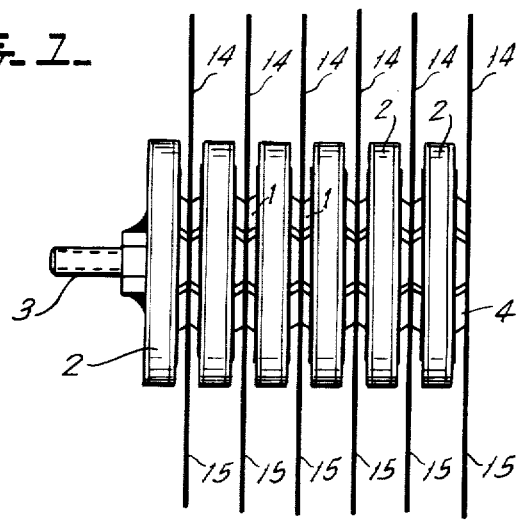
Figure 2:
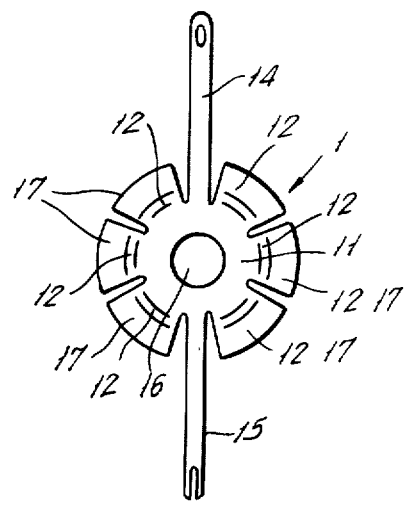
Figure 3:
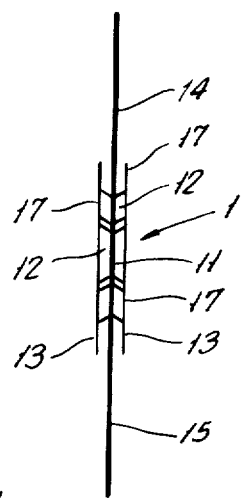
Figure 4:
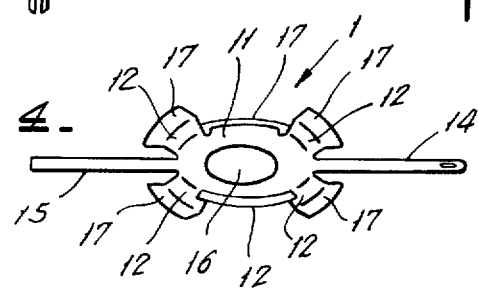

United States Patent [19]

Weigel et al.

[11] 4,298,902
[45] Nov. 3, 1981

[54] CAPACITOR CASCADE

[75] Inventors: Helmut Weigel, Selb; Werner Wollenschläger, Wunsiedel, both of Fed. Rep. of Germany

[73] Assignee: Draloric Electronic GmbH, Fed. Rep. of Germany

[21] Appl. No.: 49,108

[22] Filed: Jun. 18, 1979

[30] Foreign Application Priority Data

Dec. 7, 1978 [DE] Fed. Rep. of Germany ....... 2853503

[51] Int. Cl.³ .............................................. H01G 4/38
[52] U.S. Cl. .................................. 361/328; 361/321; 361/329
[58] Field of Search ........................ 361/328, 329, 321

[56] References Cited

U.S. PATENT DOCUMENTS 2,303,391 12/1942 Rosenthal .......................... 361/329

FOREIGN PATENT DOCUMENTS 500167 2/1939 United Kingdom ................ 361/329

Primary Examiner—Elliot A. Goldberg

[57] ABSTRACT

A capacitor cascade is disclosed comprising a columnar array of ceramic disk capacitors, each consisting of a ceramic disk with metal electrodes on opposite surfaces thereof. A metal electric connecting part is positioned between adjacent capacitors and is in electrical contact with the opposed electrodes. The connecting parts are resilient. The capacitor cascade is secured together. The connecting parts are each comprised of a base part and elements extending from the base part into engagement with the opposed capacitor electrodes. In one embodiment, each connecting part is deformed to define feet extending toward each of the opposed electrodes. In another embodiment, each connecting part is shaped to define tongues and the connecting part is folded into a generally "S" shape, wherein each tongue engages a respective one of the opposed electrodes. In the latter case, the tongues may be shaped so as to define spacing limitations for limiting the extent to which the tongues may deflect toward each other.

17 Claims, 11 Drawing Figures

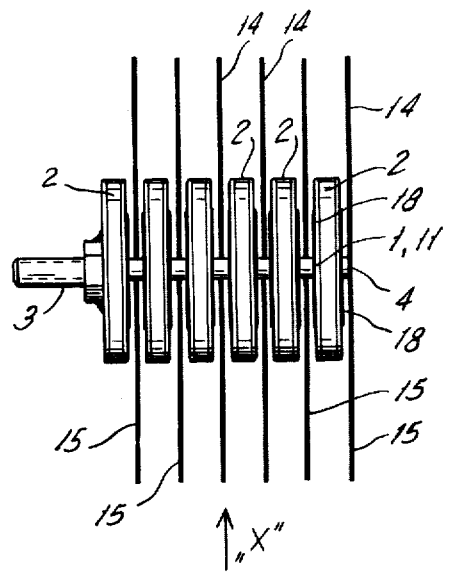
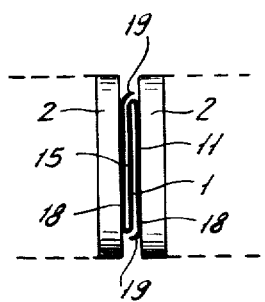
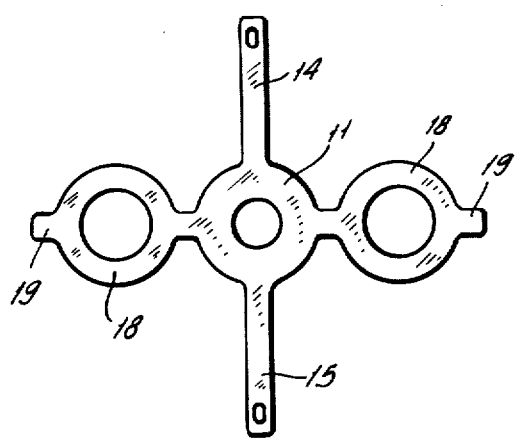
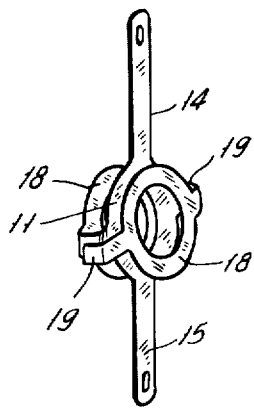
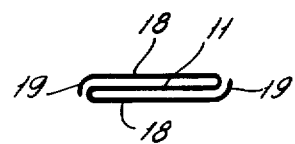
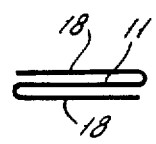
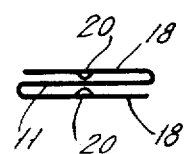

CAPACITOR CASCADE

BRIEF DESCRIPTION OF THE DRAWINGS ple, in U.S. Pat. No. 4,128,816, a junction diode and a bipolar transistor are employed to translate a threshold gate of transistor 17 is biased by the voltage drop across transistor 16. It will be noted that both transistors 14 ments 1 protrude radially beyond the disk capacitors 2. At the other end of the cascade there is a mounting 4 which can be of a construction similar to that for the connecting parts 1 between the disk capacitors 2 and which also has corresponding terminal lugs 14, 15.

FIG. 6 shows a portion of a capacitor cascade, in particular a connecting part 1 which consists of a central base part 11 and two tongues 18 which are bent over in S-shape towards the base part. On the ends of the tongues 18 there are developed arms 19 which are bent perpendicular to the tongues 18 and form a spacing limitation between the disk capacitors 2 which are elastically connected by the connecting part 1.

FIG. 7 shows a connecting part 1 in developed or unfolded shape, consisting of a base part 11 from which the two tongues 18 project radially at diametrically opposite locations and the two terminal lugs 14, 15 protrude cross-wise or offset by 90° from the tongues 18. The tongues 18 and the base part may be of circular or annular development. On the opposite outermost ends of the tongues 18 there can be formed arms 19 which are bent in opposite directions perpendicular to the tongues 18 and extending away from the adjacent capacitor and toward the other capacitor which serve as spacing limitation.

FIG. 8 shows a perspective view of the completed connecting part 1 consisting of the base part 11, the two annular tongues 18 arranged by being bent parallel to the base part and the bent arms 19 which are developed on the tongues and serve as spacing limitation between two disk capacitors. The two diametrically opposite terminal lugs 14, 15 for the diodes of a voltage-multiplier cascade are developed on the base part 11. FIGS. 9a, b and c shows three different embodiments of connecting parts in plan view, like FIG. 6. Two tongues 18 extend and are bent to define an S-shape with respect to a base part 11. In order to limit the free path of swing of two disk capacitors with respect to each other, an arm 19 can be developed on each of the ends of the tongues 18 as shown in the embodiment of FIG. 9a. No spacing limitation for the disk capacitors is provided in the embodiment of FIG. 9b. In another embodiment of FIG. 9c, the spacing limitation between adjacent disk capacitors is effected by conical dimples 20 in the center of the circular tongues 18.

We claim:

1. A capacitor cascade comprising:
   a columnar array of ceramic disk capacitors, each said capacitor comprising a ceramic disk with opposite surfaces and a respective metal electrode on each said opposite surface, a said electrode of each said capacitor in said array being opposed to a said electrode of an adjacent said capacitor in said array;
   a respective metallic connecting part being interposed between each pair of adjacent said disk capacitors for connecting said capacitors in series and each said connecting part being in mechanical and electrical contact with the opposed electrodes of the respective said pair of adjacent capacitors, each said connecting part comprising a metal sheet including a flat base part, a series of feet developed around said base part and projecting in opposite directions away from said base part towards the adjacent said capacitor electrodes, said feet terminating in respective contact portions deformed so as to be in surface contact with the said electrodes which they engage, said connecting parts being resilient, and therefore being resiliently deformable under pressure applied to said columnar array; and
   means for fastening said columnar array of said capacitors together with said connecting parts between adjacent said capacitors, said fastening means applying axial force for holding said columnar array together.

2. The capacitor cascade of claim 1, wherein alternate said feet of said connecting parts around said base part extend in opposite directions toward the two adjacent said electrodes.

3. The capacitor cascade of claim 1, wherein said contact portions of said feet are soldered to said electrodes.

4. The capacitor cascade of either of claims 1 or 2, wherein said contact portions are planar in the planes of the respective said electrodes they contact.

5. The capacitor cascade of either of claims 1 or 2, wherein said feet are inclined obliquely toward said capacitor electrodes between said connecting part base part and said contact portions.

6. The capacitor cascade of claim 5, wherein said contact portions are planar in the planes of the respective said electrodes they contact.

7. The capacitor cascade of claim 4, wherein said connecting part contact portions have diametral dimensions adapted to the dimensions of the respective said metal electrodes which said contact portions engage.

8. A capacitor cascade, comprising:
   a columnar array of ceramic disk capacitors, each said ceramic capacitor comprising a ceramic disk with opposite surfaces and a respective metal electrode on each said opposite surface, an electrode of each said capacitor in said array being opposed to a said electrode of an adjacent said capacitor in said array;
   a respective metallic connecting part being interposed between each pair of adjacent said disk capacitors for connecting said capacitors in series and each said connecting part being in mechanical and electrical contact with the opposed electrodes of the respective said pair of adjacent capacitors, said connecting part being comprised of sheet metal and being shaped so as to have a base part and two tongues projecting outwardly from spaced apart locations around said base part, said tongues being bent around with respect to said base part such that said tongues and said base part define a generally "S" shape and said tongues have respective surfaces thereof which are normally spaced from and generally parallel to the opposed surface of said base part, said connecting parts being resilient, and therefore being resiliently deformable under a pressure applied to said columnar array; and
   means for fastening said columnar array of said capacitors together with said connecting parts between adjacent said capacitors and wherein said fastening means applies axial force for holding said columnar array together.

9. The capacitor cascade of claim 8, wherein said tongues project from diametrally opposite locations around said base part.

10. The capacitor cascade of one of claims 1 or 8, further comprising terminal lugs attached to and extending away from said base part of said connecting part.

11. The capacitor cascade of claim 10, wherein there are two said terminal lugs defined at diametrally opposite locations around said base part.

12. The capacitor cascade of claim 9, wherein two terminal lugs are attached to and extend away from said base part of said connecting part at diametrically opposite locations around said base part, and said tongues and said terminal lugs being offset from each other by approximately 90° around said base part.

13. The capacitor cascade of either of claims 8 or 12, further comprising arms formed at the periphery of said tongues; each said arm being bent in a direction toward the said capacitor that is away from the said capacitor whose said electrode the respective said tongue is engaging, for defining a spacing limitation between adjacent said disk capacitors.

14. The capacitor cascade of either of claims 8 or 12, wherein each said tongue is provided with a dimple thereon which extends toward said base part, thereby defining a spacing limitation for limiting deflection of said tongue toward said base part.

15. The capacitor cascade of claim 8, wherein each said tongue is an annular ring including a surface thereof for engaging the adjacent said capacitor electrode.

16. The capacitor cascade of either of claims 8 or 15, wherein each said tongue has a diametral dimension which is adapted to the diametral dimension of the said electrode of the adjacent said disk capacitor.

17. The capacitor cascade of claim 10, wherein said terminal lugs are of a length to extend radially beyond the edges of said disk capacitors.

* * * * *